Patented Apr. 7, 1942

2,278,942

UNITED STATES PATENT OFFICE 2,278,942

OLIVE

Albert Musher, New York, N. Y., assignor, by mesne assignments, to Food Manufacturing Corporation, Chicago, Ill., a corporation of New York No Drawing. Application January 20, 1942, Serial No. 427,443

5 Claims. (Cl. 99—103)

This application relates to the treatment of olives, and more particularly to the treatment of olives which have been dried or dehydrated, and still more particularly to the treatment of dried black ripe olives.

It is among the objects of the present invention to prepare olives so that the oil cells and structure of the olives will be opened so as to enable the production of oil therefrom more readily and in a better condition.

It is also among the objects of this invention to prepare olives in such a condition so that these olives either in their whole condition or in their ground condition may be mixed with other materials so as to carry their flavor more readily into such other materials.

It is a further object of the present invention to treat olives so that the pits may be removed more readily therefrom.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing these objects it has been found most satisfactory to dry the olives either in the sun, or in a tray dryer, for example, or at a temperature ranging, for instance, from around 90° F. or 100° F. to about 160° F. or 180° F., until the water content is reduced, for example, to less than about 10% to 15%, and until the oil content of the flesh is increased to approximately 40% to 60%, or over.

These olives are then placed in a closed chamber in which they are subjected to an elevated pressure ranging, for example, from between about 20 or 25 pounds per square inch to about 300 or 350 pounds per square inch and at a temperature ranging, for example, between about 250° F. and 550° F., and for a time period ranging, for instance, from 3 to 10 seconds, to 5 or 6 minutes, or longer, depending upon the results desired, and the equipment and other conditions that are used. During this procedure the chamber may or may not be rotated, as desired.

The chamber then is suddenly and instantaneously opened into a low pressure (preferably relatively unconfined) area, such as the atmosphere, whereupon the olives are ejected from the chamber and result in a cell or structure disrupted condition, with expansion of the flesh having taken place, but generally without substantial disintegration, shattering or disruption of the unity of the olives, depending upon the procedures used.

The pressure and temperature may be obtained by introducing saturated or superheated steam into the chamber, or if desired, the chamber may be externally heated, in which case steam may be admitted to the chamber, or, the moisture content of the olives may be so regulated so that the moisture from within the olives will generate the necessary pressure. For various modifications and results in carrying out this invention the steam may be moist or dry.

Also, various flavoring materials such as salt, for example, or other flavoring materials, either dry or liquid, or water, may be admitted or placed in the chamber so as to become impregnated within the flesh of the olives during this treatment or otherwise modify the resultant product.

Various advantages that may be noted in the olive material that is produced in accord with this invention, include, for example, an enhanced flavor, more readily removed pits, increased oil yield or higher quality, or oil that is surprisingly more stable and more resistant to oxidative deterioration.

Moreover, when the olive flesh is removed from the pits and macerated, an olive butter or an olive paste of improved smoothness and enhanced spreading quality may be produced and also more stable and better keeping qualities may be noted.

After the treatment described herein, the olives, either in a ground or macerated condition, or not in such ground or macerated condition, or with or without the pits removed, may be subjected to an expeller expression, a hydraulic press treatment or to other extraction or expression procedures so as to remove the oil therefrom. Various solvents, as for example, hexane, may be used for extraction.

If desired, in the expression of the oil from the olives, the olives may be heated either in a dry atmosphere or with hot water or steam so as to remove a portion of the oil therefrom, after which, the olives may be subjected to the usual extraction or expression procedures.

In some cases it is desirable to remove a portion of the oil from the dried olives prior to exposure to the high pressure and temperature conditions in the chamber. The advantage of this procedure is to eliminate any excessive development of oiliness in the chamber during this procedure.

In carrying out this invention, it is also possible to precook in water or other liquids, presteam, prefreeze, dry roast or oil roast, multiple explode, enzyme-treat, water wash or water soak the olives in order to obtain the specific results required, as for example, in order to produce enhanced expressing of the oil therefrom, in order to produce a more tender olive for edible purposes, in order to modify the cell disruption or the structure disruption of the olives, and so forth. Also, various combinations of these embodiments may be utilized at different places in the procedure.

Wherever the olives are to be exploded following any of these embodiments in which water or moisture is used, it generally will be necessary to dry the olives as herein described prior to the subsequent explosion treatment.

Where the olives are frozen so as to enhance the breaking of the oil cells, the olives should be given a slow freeze so as to build up relatively large ice crystals therein and so as thereby to aid in disrupting the oil cells. Also for this freezing procedure, the olives should have sufficient moisture within them so as to enable the formation of the ice crystals of sufficiently large size. If necessary, presteaming, water boiling, or other moisture absorption treatments may be used to incorporate a sufficient quantity of water within the olives before the freezing procedure.

The advantage of using the multiple explosion treatment in the processing of the olives is that lower temperatures and lower pressures may be utilized than would have to be used to produce relatively the same results if a single explosion was used. In the carrying out of multiple explosions, the explosion or chamber treatment above described is repeated one or more times. These repeated treatments may be carried on at the same temperatures and pressures, at higher temperatures and pressures, at lower temperatures and pressures, or at variable temperatures and pressures than the original explosion.

As a further result of this treatment, the structure of the olive flesh is so disrupted so that not only will the oil be more easily expressed therefrom but also various water soluble flavors may be more readily expressed, and in greater volume, and also in better condition.

The olive pits, after removal from olives, may also be exposed to high pressures and high temperatures, except that the pressures and temperatures required for the olive pits should be considerably higher than required for olive flesh or for whole olives.

This invention may be carried out in conjunction with olives which are mature or immature, ripened or unripened, cured or uncured, salted or unsalted, oil treated or not. Uncured olives and also salted olives may be used to advantage in some cases.

The explosion procedure herein described may be used to remove the pits from olives although, in most cases, the temperatures and pressures that are required for this purpose are such as to harm the olives themselves.

Aside from preparing olives for oil expression and extraction purposes, this invention may be utilized to produce olives in a more tenderized condition and with other improved edible qualities, where the olives are to be used for edible purposes particularly as whole olives but also for olive meats, olive paste, olive butter, etc.

Also, where desired, the conditions of temperature and pressure may be so adjusted so as to remove the skins from the olives.

Further advantages with reference to the carrying out of this invention may include, for example, a disembittering of the olives, an improved flavor in the olives, easier removal of the pits from the olives, and so forth.

In expressing the oil from the olives in this invention, it is many times of considerable advantage to use a liquid material such as water, or most preferably to use another oil as for example, cottonseed oil or corn oil, which oil is intimately mixed with the olives, which are preferably in a macerated or ground condition, after which the expression or extraction takes place.

Also, the macerated or ground olives may be mixed with vegetable oil, mineral oil or other oils or fats, in proportions, for example, of 5, 10, or 15 parts of macerated olives with 85, 90, or 95 parts of the oil or fat. Then, either with or without heat and with or without grinding together, as for example with a colloid mill, the olives, either with or without their pits, may be infused with the oil or fat so as to result in a carrying of flavor or infusion of flavor from the olives into the oil or fat. Then, if desired, the olive residue may be filtered or removed therefrom.

Although the olives used in the carrying out of this invention should generally be dried as described herein, nevertheless, for certain specific results, the olive in its original moisture condition may be utilized, or, the olive in its original moisture condition may be exploded, then dried, and then exploded again, if desired.

*Example I*

Ripe black olives are sun dried in accord with the usual procedure for producing sun dried olives. These dried olives are placed in a closed chamber and saturated steam is allowed to enter into the chamber so as to build up as quickly as possible a pressure of 215 pounds per square inch at a temperature of about 395° F. The olives are kept in the chamber under these conditions for a period of 20 seconds and immediately thereafter the chamber is suddenly opened to the atmosphere so as to result in an instantaneous drop in pressure and ejection of the olives.

*Example II*

Dried black ripe olives are treated in accord with the process explained in Example I, except that the pressure is 25 pounds per square inch, the temperature is about 265° F. and the time periods is 3 minutes. The process outlined in this example differs from the process in Example I in that a very low pressure is used with a substantial increase in the time period.

*Example III*

Dried olives are given the same treatment as described in Example I except that the pressure is 140 pounds per square inch, the temperature is about 360° F. and the length of time is 5 seconds.

The process for the olives in this example differs from the process of Example I in that the time period is substantially less and the temperature and pressure conditions are less, so as to produce a more tender olive in its usual whole olive form, for edible purposes.

*Example IV*

Dried black ripe olives are treated in accord with the treatment described in Example I except that the pressure is 140 pounds per square inch, the temperature is about 360° F. and the time period is 10 seconds.

This explosion treatment is repeated three times, using the same conditions of temperature, pressure and time each time, so as to produce an expanded, more tender olive.

*Example V*

Dried black ripe olives are treated in accord with the procedure outlined in Example I except that the pressure is 215 pounds per square inch, the temperature is 550° F., and the time period is 10 seconds, the steam being superheated steam.

*Example VI*

The exploded olives of Example I with the pits included, are placed in an oil expeller and pressed so as to express the oil therefrom.

What is claimed is:

1. A structure disrupted, steam exploded olive, said olive being in a moisture reduced condition, many of the oil cells of said olive being in a broken condition.

2. The method of treating an olive said method comprising substantially reducing the moisture of the olive, then subjecting the olive to steam at an elevated temperature and pressure, and then suddenly releasing to a substantially lower temperature and pressure.

3. The method of treating an olive said method comprising substantially reducing the moisture of the olive by curing it with salt, then subjecting the olive to steam at an elevated pressure and temperature, and then suddenly releasing to a substantially lower temperature and pressure.

4. The method of treating an olive pit, said method comprising subjecting the olive pit to steam at an elevated pressure and temperature and then suddenly releasing to a substantially lower temperature and pressure.

5. The method of treating an olive said method comprising freezing the olive, then substantially reducing the moisture of the olive, then subjecting the olive to steam at an elevated temperature and pressure, and then suddenly releasing to a substantially lower temperature and pressure.

ALBERT MUSHER.